United States Patent [19]

Ouellette

[11] Patent Number: 5,691,715
[45] Date of Patent: Nov. 25, 1997

[54] METHOD AND APPARATUS FOR DETECTING FRAUDULENT POWER LINE COMMUNICATIONS SIGNAL

[75] Inventor: Maurice Joseph Ouellette, North Berwick, Me.

[73] Assignee: General Electric Company, New York, N.Y.

[21] Appl. No.: 591,128

[22] Filed: Jan. 25, 1996

Related U.S. Application Data

[63] Continuation of Ser. No. 263,994, Jun. 22, 1994, abandoned.

[51] Int. Cl.$^6$ .................................................. G08B 19/00
[52] U.S. Cl. .................... 340/870.09; 340/870.02; 340/870.03; 340/310.01; 340/825.3; 340/825.31; 340/825.34; 379/106; 379/107
[58] Field of Search ................. 340/870.02, 870.03, 340/870.07, 870.09, 825.3, 825.31, 825.32, 825.34, 310.01; 379/106, 107

[56] References Cited

U.S. PATENT DOCUMENTS

| | | | |
|---|---|---|---|
| 3,961,317 | 6/1976 | De Brum et al. | 340/870.03 |
| 4,749,992 | 6/1988 | Fitzmeyer et al. | 340/870.02 |
| 5,090,024 | 2/1992 | Vander Mey et al. | 375/2 |
| 5,263,046 | 11/1993 | Vander Mey | 375/2 |
| 5,278,862 | 1/1994 | Vander Mey | 375/2 |
| 5,432,507 | 7/1995 | Mussino et al. | 340/870.07 |
| 5,432,850 | 7/1995 | Rothenberg | 340/825.31 |

OTHER PUBLICATIONS

Intellon Advance Information, *SSM10CE CEBus Compatible Spread Spectrum Powerline Modem*, Aug. 30, 1991, Rev. 0.1.
Intellon Advance Information, *SSC PLCE CEBus Spread Spectrum Power Line Modem*, Dec. 4, 1991, Rev. 0.2.
Intellon Product Brief, *SSC PLCEMO CEBus Spread Spectrum Power Line Modem Board*, ©1992.
Intellon Advance Information, *SSC PLCE CEBus Spread Spectrum Power Line Modem*, Feb. 26, 1992, Rev. 0.3.
Intellon Corporation, *Spread Spectrum Carrier™ Technology Enabling Reliable Communications Over Noisy Media*.
Electronic Industries Association Engineering Department, EIA Interim Standard, "EIA Home Automation System (CEBus)" EIA/IS-60, Book 1 (vol. 1 thru 4), Oct. 1992.
GE Meter and Control, GE UCNet System, UCNet™ Puts You in Touch with Your Customers, GEA 12021, Sep. 1991.
GE Meter and Control, Engineering Presentation to AEIC/EEI Meter and Service Committees, GET-6638.22, Sep. 1991.

*Primary Examiner*—Thomas Mullen
*Assistant Examiner*—Ashok Mannava
*Attorney, Agent, or Firm*—Bell, Seltzer, Park & Gibson; Carl B. Horton

[57] ABSTRACT

A method and apparatus for detecting signals transmitted via a power line to a node which have a source address portion equal to the predetermined address of an electrical metering device, but which were not transmitted by the metering device. Each electrical metering device of a power line communications system has a predetermined address and may monitor the source address portions of signals transmitted via the power lines. The electrical metering device thus detects or flags a power line signal if the source address portion of the transmitted signal matches the predetermined address of the electrical metering device. The electrical metering device may also count the signals having source address portions which match the predetermined address of the electrical metering device. Alternatively, the electrical metering device may transmit a predetermined message on the power lines if a signal is transmitted which has a source address portion which matches the predetermined address of the electrical metering device.

20 Claims, 3 Drawing Sheets

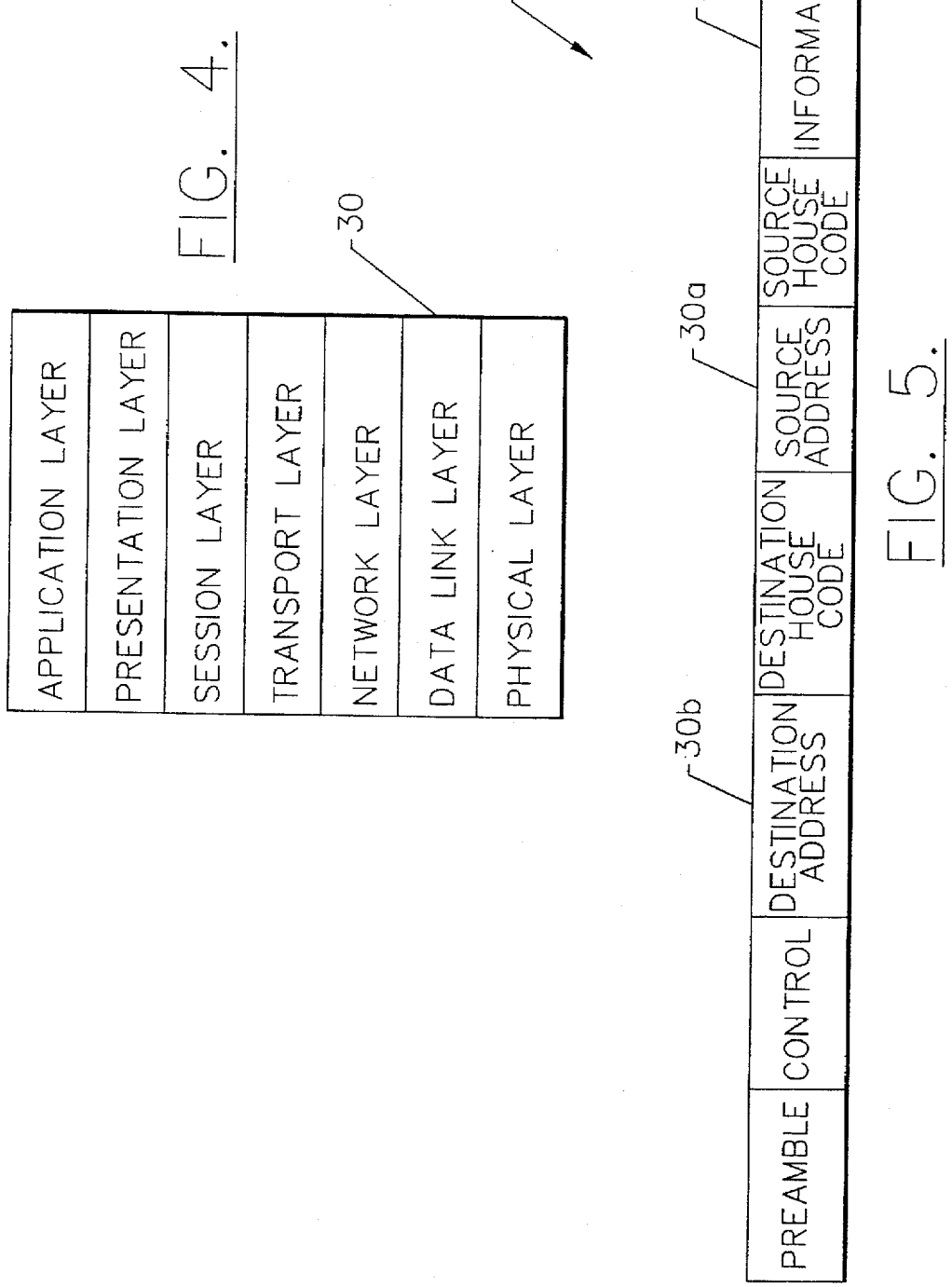

METHOD AND APPARATUS FOR DETECTING FRAUDULENT POWER LINE COMMUNICATIONS SIGNAL

This application is a continuation of application Ser. No. 08/263,994, filed Jun. 22, 1994 now abandoned.

FIELD OF THE INVENTION

The present invention relates to a power line communications system and, more particularly, to a method and apparatus for monitoring signals transmitted via the power line communications system.

BACKGROUND OF THE INVENTION

Modern electrical power distribution systems supply power to a large number of electrical loads. The power consumed by each electrical load is separately measured by an electrical metering device, such as an induction or electronic type watthour meter. While electrical loads may be specific electrical devices, such as motors or water heaters, the electrical loads referred to herein are typically the entire electrical loads, such as residences, factories or businesses, on the load side of an electrical metering device. Many electrical power distribution systems include tens of thousands, hundreds of thousands or more metering devices.

Induction type watthour meters have historically been utilized to measure electrical energy consumption. Recently, however, an increasing number of electrical metering devices, such as electronic type watthour meters, have been employed to measure electrical energy consumption. The use of electronic type watthour meters has increased, in part, since electronic meters can measure several quantities in addition to tabulating the kilowatt hours of power consumed by the corresponding load. For example, electronic type watthour meters can measure the power factor, kilovolt amperes ("KVA"), and reactive volt amperes of the power consumed by the load.

The increased metering flexibility and capacity provided by electronic type watthour meters is due, at least in part, to the electronic acquisition, integration and processing of the measured electrical consumption of the load by, for example, an electronic processor or controller. In addition, electronic type watthour meters may be reprogrammed to alter their operation once they have been installed so as to offer additional metering flexibility.

In order to "read" the electrical metering device to determine the power consumption of the associated load or to reprogram the electrical metering device, electrical metering devices include means for externally communicating. One method of communicating with electronic type watthour meters employs observation of a display associated with the meter. Alternatively, signals may be optically transmitted to and received from an electronic type watthour meter having an optical port with a corresponding optical probe. Both communications methods, however, require the meter to be physically visited in the field.

Since modern electrical power distribution systems include tens of thousands, hundreds of thousands or more metering devices, a power line communications method has been employed to transfer signals to and receive signals from electronic type watthour meters without having to physically visit the meter in the field. Many different types of signals may be transmitted such as signals which are indicative of the quantities measured by the metering device, such as kilowatt hours of power consumed, so as to permit the meter to be "read" from a remote location. The signals may also include revised instructions to reprogram the electronic meter.

One power line communications system is the UCNet™ system marketed by General Electric Company, assignee of the present invention. The UCNet™ system is described and illustrated in a publication entitled "GE UCNet System" by GE Meter and Control of Somersworth, N.H., which bears document number GEA12091 9/91 7M. The UCNet™ system is also described in a publication entitled "Engineering Presentation to AEIC/EEI Meter and Service Committees" by GE Meter and Control which bears document number GET-6638.22 9/91 (3M). The disclosures of both publications are incorporated herein by reference.

A typical power line communication system, such as that illustrated in U.S. Pat. No. 4,749,992 to Fitzemeyer which is incorporated herein by reference, includes a central control station, typically referred to as a system control center, which transmits signals to one or more radio towers. The signals may be transmitted to the radio tower by RF transmission or by cable television or telephone lines or by a satellite or microwave link. Each radio tower, in turn, rebroadcasts the signals to a plurality of nodes, such as by RF transmission. Thus, as known to those skilled in the art, a power line communications system, such as the UCNet™ system, provides communications not only via the power lines, but also via RF transmission between the system control center, the plurality of radio towers and the plurality of nodes.

Each node is typically a remote local relay module associated with a distribution transformer. Each relay module then transmits the signals to the individual, electrical metering devices via the power lines which connect the associated distribution transformer to the metering devices. Thus, the power lines, in addition to transferring electrical power to the metering device and the electrical load, also acts as a communications bus for communications between the node and the metering devices. Accordingly, a local area network is established between a node and the electrical metering devices operably connected to the secondary side of the distribution transformer associated with the node.

A power line communications system, such as the UCNet™ system, not only includes the power lines extending from the distribution transformer to the electrical loads, i.e. residences or businesses, but also the electrical wiring within the residences or businesses. The UCNet™ and other systems transmit signals via the power lines according to a predetermined format or protocol such as the consumer electronics bus ("CEBus") protocol. The CEBus protocol for power line signals is described by the Electronic Industries Association of Washington, D.C. in an interim standard entitled "EIA Home Automation System (CEBus)", the contents of which are incorporated herein by reference.

The electronic type watthour meters coupled to the electrical loads of the distribution transformer include a power line modem for receiving and translating the signals transmitted via the power lines. The power line modem thereafter provides the translated signal to the controller or processor of the electronic type watthour meter. The power line modem is bidirectional so as to also transmit signals from the electronic type watthour meter on the power lines.

The node and each electronic type watthour meter within a local area network is assigned an address. As explained in more detail in the publication entitled "EIA IS-60 CEBus Volume 4 Node Protocol Draft Standard", the standard CEBus protocol includes seven hierarchical layers. The data link layer includes fields for the actual command or signal to be transmitted, designated the information field, as well as fields for the source address and the destination address of the signal. Accordingly, the device which sent and the device which is to receive the signal are identified by their respective predefined addresses.

Since the power line communications system also includes the electrical wiring of residences and businesses, the power line communications system is not secure. Instead, numerous household appliances may be connected to the electrical wiring, and thus the power line communications system, of a residence or business. Consequently, the power line communications system may be accessed by any number of individuals. For example, an individual could access the electrical wiring of a home or business, and thus the power line communications system, via a personal computer having an appropriately programmed modem.

In addition, the CEBus format or protocol is both standard and publicly available. Accordingly, individuals who desire to access the power line communications system may readily determine the appropriate CEBus protocol for the signals. Since signals indicative of the power consumption of a load are typically transmitted via the power lines from the electronic type watthour meter associated with the load to the node, individuals attempting to defraud the power distribution company could transmit signals via the power lines in addition to or in lieu of the signals generated by the metering device. The signals could provide an inaccurate, i.e. decreased, measurement of the power consumed by the load. Thus, based upon the inaccurate signal, the amount which the power distribution company would charge for the electrical consumption of the load would be inaccurate.

Several methods have been proposed to prevent the transmission of false signals which provide an inaccurate measurement of the power consumed by an electrical load. For example, encryption and authentication methods have been employed to insure that the signals transmitted via the power line communications system originate from the electronic metering device itself and have not been improperly transmitted, such as from a personal computer connected to the electrical wiring of a residence or business. Although these methods are effective, they have added to the complexity of the CEBus protocol and have slowed the speed with which signals may be transmitted via the power lines.

Thus, it would be desirable to detect fraudulent signals transmitted via the power lines. Once detected, the fraudulent signals may be corrected such that the power consumption of each consumer is properly allocated.

SUMMARY OF THE INVENTION

It is therefore an object of the invention to provide an improved method and apparatus for detecting fraudulent signals transmitted on a power line communications system.

It is another object of the invention to provide an improved method and apparatus for detecting fraudulent power line signals transmitted according to CEBus protocol.

These and other objects are provided, according to the invention, by an electrical metering device which monitors the source address portion of signals transmitted on an associated power line communications system and detects those signals having a source address portion which matches the predetermined address of the metering device which were not transmitted by the metering device. Thus, signals transmitted via the power lines to a node which have a source address portion equal to the predetermined address of an electrical metering device, but which were not transmitted by the electrical metering device, may be identified.

The detected signals having a source address portion equal to the predetermined address of the metering device, but which were not transmitted by the metering device, can have one of two origins. The detected signals can result from tampering or sending false signals from a personal computer or other device which is pretending to be the metering device and is transmitting a fraudulent power reading. Alternatively, the detected signals could result from an addressing or other error on the power line communications system. In either instance, the method and apparatus of the present invention will detect and flag these erroneous signals.

In particular, each electrical metering device is individually coupled to an electrical load and includes metering means for measuring the electrical consumption of the load as well as means, such as a power line modem, for transmitting signals to and receiving signals from a node via the power lines. The signals include a message portion and a source address portion. For signals transmitted by an electrical metering device, the source address portion is the predetermined address of the electrical metering device. For example, power line signals may be transmitted according to CEBus protocol. The CEBus protocol has a number of layers, including a data link layer having a source address portion and a destination address portion to define the device which sent the message and the device which is to receive the message, respectively. Accordingly, the electrical metering device preferably includes means for monitoring the source address portion of the data link layer of signals transmitted via the power lines.

The electrical metering device also preferably includes means for comparing the source address portion of signals transmitted via the power lines with the predetermined address of the electrical metering device. Further, the electrical metering device preferably includes register means, operatively connected to the metering means, for tabulating the measured power consumption of the associated electrical load.

In one embodiment, the detecting means includes means for counting the power line signals having source address portions which match the predetermined address of the electrical metering device. Accordingly, the number of improperly addressed signals which were transmitted via the power lines may be determined. In another embodiment, the detecting means includes means for transmitting a predetermined message via the power lines if the source address portion of a power line signal matches the predetermined address of the electrical metering device. Accordingly, the electrical metering device may notify other devices operatively connected to the power lines that improperly addressed signals were transmitted.

Each electrical metering device is preferably included as one portion of a power line communications system. The power line communications system also includes a system control center for transmitting and receiving signals and a plurality of nodes, preferably remote local relay modules, each of which is preferably associated with a respective one of a plurality of distribution transformers. Each node transmits signals between the system control center and a plurality of power lines which interconnect the respective one of the plurality of distribution transformers and a plurality of electrical loads. Each electrical metering device, in turn, is coupled to a respective one of the plurality of electrical loads.

Accordingly, a local area network is formed between a node and its associated electrical metering devices. The node and the associated electrical metering device may communicate according to CEBus protocol via the interconnecting power lines. A distinct address is assigned to each node and each electrical metering device such that the source and destination of signals transmitted via the power lines may be defined. The power line communications system preferably further includes a plurality of radio towers for transmitting signals between the system control center and the plurality of nodes.

Therefore, the method and apparatus of detecting signals transmitted via the power lines to a node according to the present invention allows signals which have a source address portion which matches a predetermined address of an electrical metering device, but which were not transmitted by the metering device, to be identified. A count of the improperly addressed signals may be maintained or a predetermined message may be transmitted via the power lines once an improperly addressed signal is detected. Accordingly, the electrical consumption of consumers may be properly allocated and fraudulent meter tampering may be prevented.

BRIEF DESCRIPTION OF THE DRAWINGS

FIG. 4 is a block diagram of a standard CEBus protocol.

FIG. 5 is a block diagram of the data link layer of the standard CEBus protocol of FIG. 4.

DESCRIPTION OF THE PREFERRED EMBODIMENTS

The present invention will now be described more fully hereinafter with reference to the accompanying drawings, in which a preferred embodiment of the invention is shown. This invention may, however, be embodied in many different forms and should not be construed as limited to the embodiments set forth herein; rather, this embodiment is provided so that this disclosure will be thorough and complete and will fully convey the scope of the invention to those skilled in the art. Like numbers refer to like elements throughout.

Figure 1:
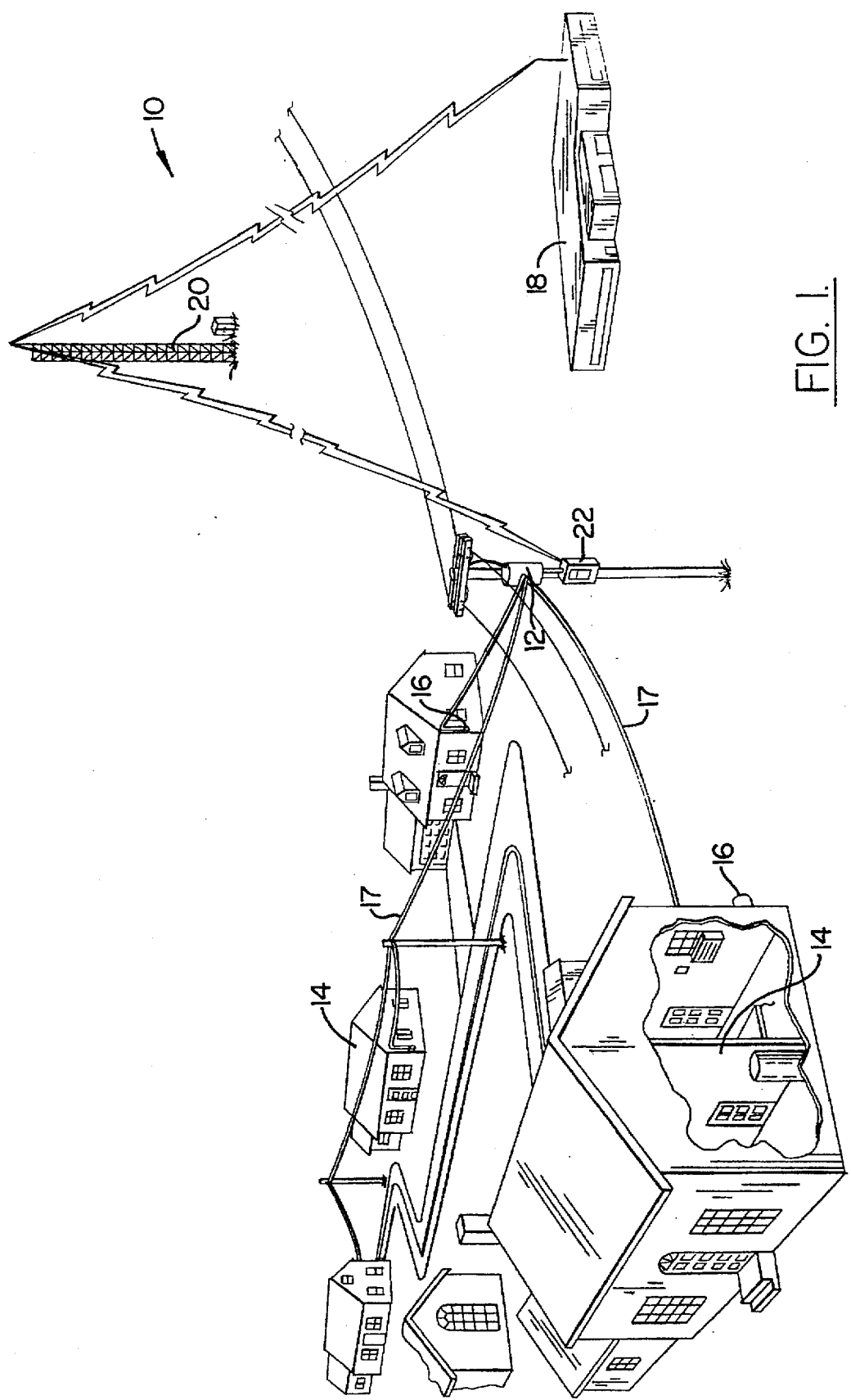
FIG. 1 is a perspective view of a power line communications system according to the present invention.

Referring now to FIG. 1, a portion of an electrical power distribution and communications system 10, such as the UCNet™ system, is illustrated. The electrical power distribution system be includes a plurality of distribution transformers 12. The secondary side of the distribution transformers 12 is generally connected to a plurality of electrical loads 14. The electrical loads 14 are typically residential homes, businesses or factories which consume electrical power. An electrical metering device 16, such an electronic type watthour meter, is coupled to each of the plurality of electrical loads 14 for measuring the electrical consumption of the corresponding load 14.

FIG. 1 also illustrates one embodiment of a power line communications system in which commands may be transmitted via the electrical power lines 17 to the plurality of electrical metering devices 16 of the present invention. Accordingly, the power lines 17 not only conduct current from distribution transformers 12 to the electrical loads 14, but also serve as a communications bus.

The power line communications system includes a central control station 18, typically referred to as a system control center, which transmits commands to a plurality of radio towers 20. The commands are preferably transmitted from the system control center 18 to the radio towers 20 via RF signals. However, the signals may be transmitted via cable television or telephone lines or by satellite or a microwave link. The radio tower 20 thereafter broadcasts the signals, preferably RF signals, to a plurality of nodes 22. More preferably, the power line communications system includes a self-contained RF system which provides for RF transmission between the system control center 18, the radio tower 20 and the plurality of nodes 22.

Each node 22 is preferably a remote local relay module associated with a distribution transformer 12. The node 22 receives the signal and, in turn, transmits the signal via power line 17 to each electrical metering device 16 coupled to an electrical load 14 of the associated distribution transformer 12. The communications bus of a power line communications system not only also includes the power lines 17, but also typically includes the electrical wiring of the electrical load, such as the wiring extending through a residence or a business.

Figure 2:
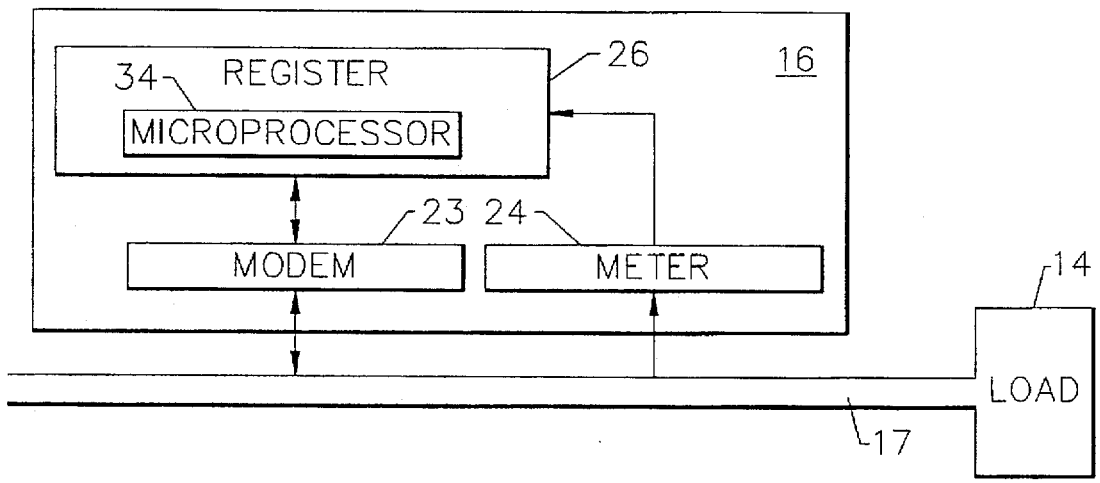
FIG. 2 is a block diagram of an electrical metering device of the power line communications system of FIG. 1.

Referring now to FIG. 2, an electrical metering device 16 according to the present invention is illustrated in block diagram form. Each electrical metering device 16 preferably includes metering means 24 for measuring the electrical power consumption of the load 14 to which the metering device 16 is coupled. The metering means 24 typically produces a pulse for each quantum of energy consumed by the corresponding load 14. Alternatively, the metering means 24 may produce a signal having a frequency or pulse repetition rate related to the energy consumed by the corresponding load 14.

Each electrical metering device 16 also preferably includes register means 26, responsive to the metering means 24, for tabulating the electrical consumption of the load 14. In addition, each electrical metering device 16 of the present invention includes means, such as a power line modem 28, for receiving and transmitting signals via the power lines. Each signal transmitted by the electrical metering device 16 includes a message portion and a source address portion which, for signals transmitted by the electrical metering device 16, is the predetermined address of the metering device 16.

More preferably, the signals via the power lines 17 transmitted by the electrical metering device 16 are formatted according to the standard CEBus protocol as illustrated in FIGS. 4 and 5 and explained in greater detail in the publication entitled "EIA IS-60 CEBus Volume 4 Node Protocol Draft Standard". As illustrated in FIG. 4, the CEBus protocol includes seven layers, including a data link layer 30. The data link layer 30 includes several predefined fields including source and destination address fields 30a and 30b, respectively, to identify the source and intended recipient of the power line signal. The data link layer 30 also includes an information field 30c for transmitting the message itself.

Accordingly, each node 22 and each associated electrical metering device 16 is assigned a predetermined address. Thus, signals transmitted from either a particular metering device 16 or a node 22 have a source address equal to the predetermined address of the metering device 16 or the node 22, respectively. Thus, a separate local area network is established between each node 22 and its associated electrical metering devices 16 within which signals are transmitted via the power line communications system.

Figure 3:
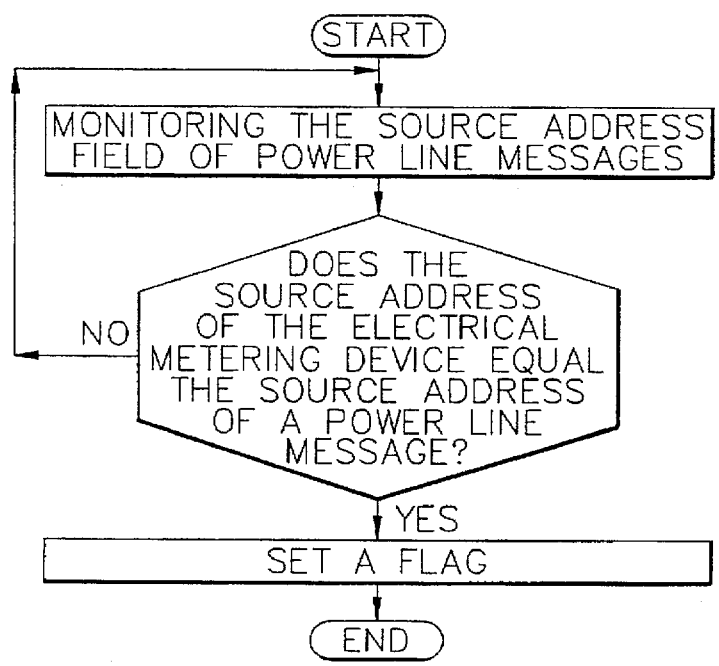
FIG. 3 is a flow chart illustrating the detection of fraudulent power line signals.

Each electrical metering device 16 also includes means for monitoring the source address portion of signals transmitted via the power line communications system. The monitoring means of the electrical metering device 16 preferably includes means for comparing the source address portion of signals transmitted via the power line communications system with the predetermined address of the metering device 16. Each electrical metering device 16 also preferably includes means for detecting or flagging a power line signal if the source address portion of the signal matches the predetermined address of the electrical metering device 16 and the signal was not transmitted by the metering device 16. Accordingly, power line signals having a source address portion which match that of the predetermined address of the electrical metering device 16 may be identified as illustrated in the flow chart of FIG. 3.

As shown in FIG. 2, the monitoring means and the detecting means may be the register means 26, a system controller 34 or the power line modem 28. In a preferred embodiment, the monitoring means and the detecting means are implemented by the system controller 34, preferably a microprocessor or microcontroller.

In one embodiment, the detecting means includes means for counting the number of signals having source address portions which match the predetermined address of the electrical metering device 16, but which were not transmitted by the metering device 16. Accordingly, the number of times in which a power line signal having an improper source address portion is transmitted may be determined. Based upon this information, it is likely an inadvertent error in addressing may have occurred if only one signal having an improper source address is transmitted within a relatively long period of time. Alternatively, if signals having an improper source address are regularly transmitted, it is possible that inaccurate measurements of the power consumption of the electrical load associated with the electrical metering device are intentionally being transmitted in an attempt to defraud the power distribution company.

The detecting means may also means for recording the transmitted signals, including the message portions, that included source address portions which match the predetermined address of the electrical metering device 16, but which were not transmitted by the metering device 16. Furthermore, the detecting means may record the date and time of transmission of the signals that included source address portions which match the predetermined address of the electrical metering device 16, but which were not transmitted by the metering device 16.

In another embodiment, the detecting means includes the means for transmitting a predetermined message via the power line communications system if the source address portion of a power line signal matches the predetermined address of the electrical metering device 16, but the signal was not transmitted by the metering device 16. Accordingly, the device, typically the node 22, which received the improperly addressed signal may be notified that an improperly addressed signal has been transmitted.

Once detected, the power distribution company may determine the origin of the improperly addressed signal, such that the power consumption may be properly allocated among the electrical loads. For example, if a signal transmitted via the power line communications system was erroneously addressed, steps may be taken to insure that future signals transmitted by the metering device 16 include a proper source address. Alternatively, if it is determined that a signal having an improper source address was transmitted in an attempt to defraud the power distribution company, appropriate steps may be taken to prevent further attempts.

Within each local area network, the node 22 and the electrical metering devices 16 communicate bidirectionally. For example, the node 22 may transmit signals to each of the electrical metering devices 16 which instructs the metering devices 16 to perform specific calculations or to provide certain measurements or data. Each electrical metering device 16 also transmits signals to the node 22 such as measurements of the amount of power consumed by the electrical load to which the metering device 16 is coupled. The measurements of power consumption provided by each electrical metering device 16 may then be transmitted from the node 22 to a radio tower 20 and, in turn, to the system control center 18 such that the power consumption may be properly allocated among the electrical loads without having to physically visit and "read" each metering device 16. In order to insure that the power consumption is properly allocated among the electrical loads 14, the predetermined address of the electrical metering device 16 transmitting the measurements must be associated with and transmitted along with the measurements.

While each electrical metering device 16 of a power line communications system 10 may include means for monitoring the source address portion of the transmitted CEBus signals and means for detecting signals having a source address portion which matches the predetermined address of the metering device 16, only a portion of the electrical metering devices 16 within the communications system 10 may actively use the monitoring means and the detecting means. For example, only the electrical metering devices 16 associated with the consumers who are suspected of attempting to defraud the power distribution company may include means to monitor the source address portion of the transmitted signals and means to detect or otherwise identify the improperly addressed signals. Alternatively, the communications system 10 and, in particular, the node 22 may selectively activate the monitoring means and the detecting means within the electrical metering devices 16. The monitoring means and the detecting means may be activated such as by a command transmitted from the node 22 to the electrical metering device 16 via the power lines 17. Thus, the monitoring means and the detecting means may be randomly activated to check the accuracy with which signals are being transmitted via the power line communications system 10.

In the drawings and the specification, there has been set forth a preferred embodiment of the invention, although specific terms are employed, the terms are used in a generic and descriptive sense only and not for purpose of limitation, the scope of the invention being set forth in the following claims.

That which is claimed is:

1. A method of detecting fraudulent signals transmitted on a power line communications system which allows a plurality of electrical metering devices to communicate with a system control center via power lines which transmit power to a plurality of electrical loads via the plurality of electrical metering devices, the method comprising the steps of:

transmitting signals via the power lines, from an electrical metering device having a predetermined address, wherein the signals transmitted by the electrical metering device include a source address portion designating the predetermined address of the electrical metering device;

monitoring a source address portion of the signals transmitted over the power lines, wherein at least a portion of the transmitted signals include the signals transmitted by the electrical metering device having the predetermined address;

comparing the transmitted source address portion with the predetermined address of the electrical metering device; and detecting fraudulently transmitted power line signals which have a source address portion which equals the predetermined address of the electrical metering device and which were not transmitted by the electrical metering device.

2. A method of detecting fraudulent power line signals according to claim 1 wherein said detecting step includes counting the number of source address portions of the power line signals which equal the predetermined address of the electrical metering device and which were not transmitted by the electrical metering device having the predetermined address.

3. A method of detecting fraudulent power line signals according to claim 1 wherein the detecting step includes transmitting a predetermined message via the power lines if the source address portion of a power line signal matches the predetermined source address of the electrical metering device and the signal was not transmitted by the electrical metering device having the predetermined address.

4. The method of detecting fraudulent power line signals according to claim 1 wherein the power line communications system transmits signals according to a consumer electronics bus protocol which has a plurality of layers including a data link layer comprising a destination address portion and a source address portion, and wherein the monitoring step includes the step of monitoring the source address portion of the data link layer of the power line signals.

5. A method of detecting fraudulent power line signals according to claim 1, the method further comprising the step of:

measuring the power consumption of an electrical load associated with the electric metering device; and wherein said transmitting step comprises the step of transmitting signals via the power lines to a node, operably connected to the electrical metering device, wherein the transmitted signals include a measurement of the power consumption of the electrical load associated with the electrical metering device.

6. An electrical metering device having a predetermined address, the electrical metering device comprising:

metering means for measuring the power consumption of an electrical load from a power line associated with said electrical metering device;

means for transmitting signals via the associated power line wherein the signals comprise a message portion and a source address portion and wherein the source address portion is the predetermined address of said electrical metering device;

means for monitoring the source address portion of signals transmitted via the associated power line, wherein at least a portion of the transmitted signals include the signals transmitted by the electrical metering device; and means for detecting fraudulently transmitted power line signals which did not originate with the electrical metering device, wherein the fraudulently transmitted power line signals have a source address portion which matches the predetermined address of said electrical metering device but were not transmitted by said electrical metering device.

7. An electrical metering device according to claim 6 wherein said monitoring means comprises means for comparing the source address portion of signals transmitted via the associated power line with the predetermined address of said electrical metering device.

8. An electrical metering device according to claim 6 further comprising means, operatively connected to said metering means, for tabulating the measured power consumption of the associated electrical load.

9. An electrical metering device according to claim 6 wherein said detecting means includes means for counting the number of source address portions of the power line signals which match the predetermined address of said electrical metering device and which were not transmitted by said electrical metering device.

10. An electrical metering device according to claim 6 wherein said detecting means includes means for transmitting a predetermined message via the associated power line if the source address portion of a power line signal matches the predetermined address of said electrical metering device and the power line signal was not transmitted by said electrical metering device.

11. An electrical metering device according to claim 6 wherein the power line comprises a communications bus and transmits signals according to a consumer electronics bus protocol which has a plurality of layers including a data link layer comprising a destination address portion and a source address portion, and wherein said monitoring means includes means for monitoring the source address portion of the data link layer of the signals transmitted via the associated power line.

12. An electrical metering device according to claim 6 wherein said detecting means comprises a system controller.

13. An electrical metering device according to claim 6 wherein said transmitting means includes a modem interconnecting said electrical metering device with the associated power line.

14. A power line communications system comprising:

a system control center for transmitting and receiving signals;

a plurality of nodes, a respective one of which is associated with a respective one of a plurality of distribution transformers, wherein each node transmits signals between said system control center and a plurality of power lines interconnecting the respective one of the plurality of distribution transformers and a plurality of electrical loads; and a plurality of electrical metering devices, a respective one of which is coupled to a respective one of the plurality of electrical loads via a respective one of the plurality of power lines, wherein each electrical metering device has a predetermined address and comprises:

metering means for measuring the power consumption of the electrical load associated with said electrical metering device;

means for transmitting signals to said node via the power lines wherein the signals comprise a message portion and a source address portion and wherein the source address portion is the predetermined address of said electrical metering device;

means for monitoring the source address portion of signals transmitted via the electrical power lines, wherein at least a portion of the transmitted signals include the signals transmitted by the electrical metering device; and means for detecting fraudulently transmitted power line signals which did not originate with the electrical metering device, wherein the fraudulently transmitted power line signals have a source address portion which matches the predetermined address of said electrical metering device but were not transmitted by said electrical metering device.

15. A power line communications system according to claim 14 wherein said detecting means includes means for counting the number of source address portions of the power line signals which match the predetermined address of said electrical metering device and which were not transmitted by said electrical metering device.

16. A power line communications system according to claim 14 wherein said detecting means includes means for transmitting a predetermined message on the electrical power lines if the source address portion of a power line signal matches the predetermined address of said electrical metering device and the signal was not transmitted by said electrical metering device.

17. A power line communications system according to claim 14 wherein each node comprises means for individually activating said monitoring means and said detecting means of each of said electrical metering devices such that the source address portion of signals transmitted via the electrical power lines may be selectively monitored.

18. A power line communications system according to claim 14 wherein the electrical power lines comprise a communications bus for transmitting signals according to a consumer electronics bus protocol which has a plurality of layers including a data link layer comprising a destination address portion and a source address portion, and wherein said monitoring means includes means for monitoring the source address portion of the data link layer of the signals transmitted via the power lines.

19. A power line communications system according to claim 14 wherein each node comprises a remote local relay module.

20. A power line communications system according to claim 14 further comprising a plurality of radio towers for transmitting signals between said system control center and a plurality of said nodes.

* * * * *